Jan. 23, 1962   H. J. JONES ETAL   3,018,468
APPARATUS FOR REDUCING AND RECORDING DATA
Filed Dec. 12, 1955   4 Sheets-Sheet 2

INVENTORS
HAL J. JONES AND
J. FRED BUCY, JR.

BY Stevens, Davis, Miller & Mosher
ATTORNEYS

Jan. 23, 1962 H. J. JONES ETAL 3,018,468
APPARATUS FOR REDUCING AND RECORDING DATA
Filed Dec. 12, 1955 4 Sheets-Sheet 3

INVENTORS
HAL J. JONES AND
J. FRED BUCY, JR.
BY *Stevens, Davis, Miller & Mosher*
ATTORNEYS Jan. 23, 1962      H. J. JONES ETAL      3,018,468
APPARATUS FOR REDUCING AND RECORDING DATA
Filed Dec. 12, 1955                     4 Sheets-Sheet 4
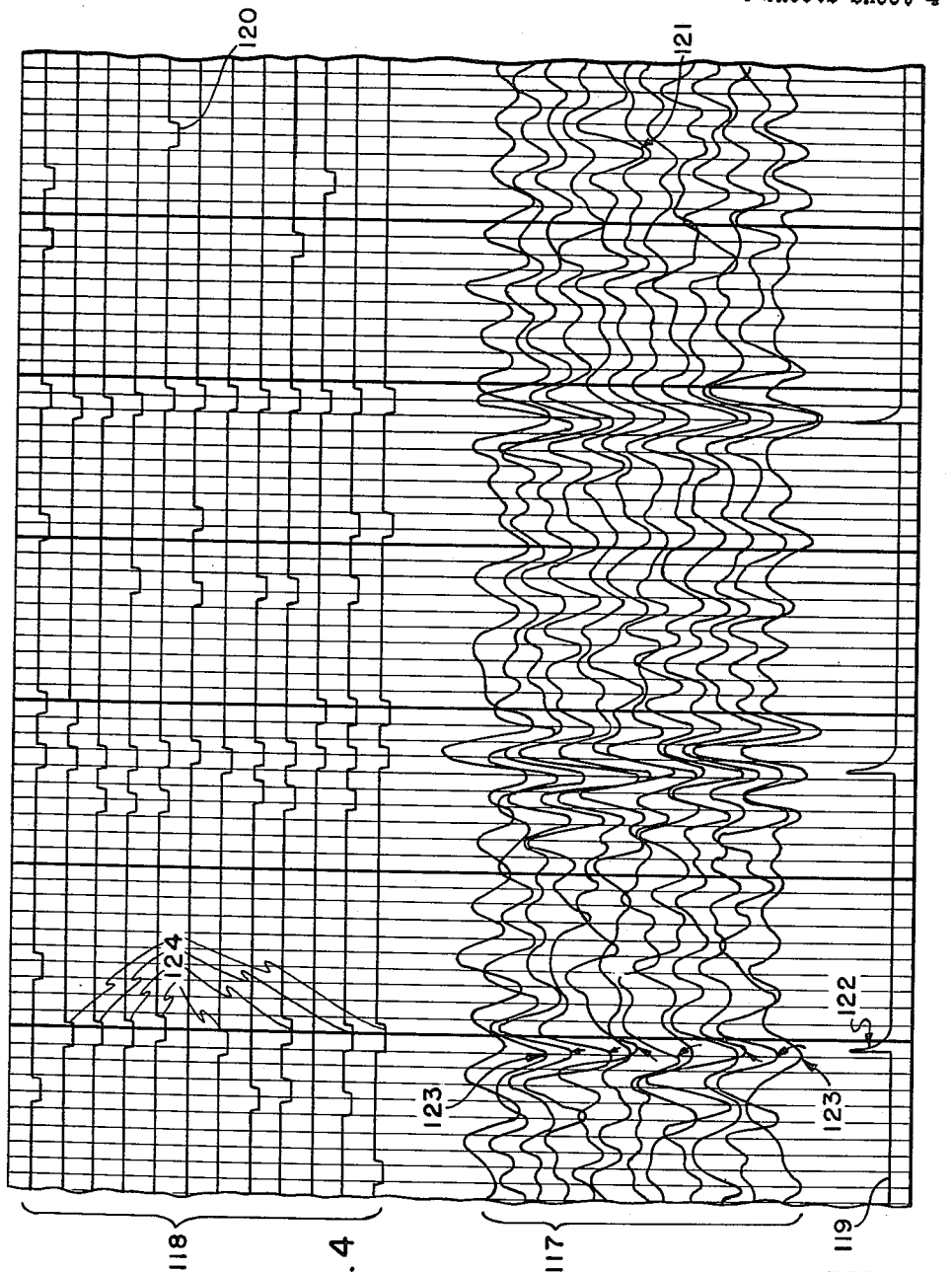
INVENTORS
HAL J. JONES AND
J. FRED BUCY, JR.
BY Stevens, Davis, Miller & Mosher
ATTORNEYS United States Patent Office 3,018,468
Patented Jan. 23, 1962

3,018,468
APPARATUS FOR REDUCING AND RECORDING DATA
Hal J. Jones and J. Fred Bucy, Jr., Dallas, Tex., assignors to Texas Instruments Incorporated, Dallas, Tex., a corporation of Delaware
Filed Dec. 12, 1955, Ser. No. 552,327
7 Claims. (Cl. 340—15)

This invention relates generally to a method and apparatus for performing certain functions in data analysis processes and more specifically to a method and apparatus for performing the functions of recognition, correlation, reduction and recording of useful information signals contained on seismic reflection records and other types of data records.

A method commonly used to obtain geological data is the seismic survey. By this method, shock waves are generated in the earth, usually by the detonation of an explosive charge, and a record kept of the arrival times of the waves which have traveled into the earth and have been reflected back to the surface from layers wherein a change in velocity occurs. Seismometers are used to detect the reflected waves and convert them into electrical signals which may be recorded by various means. Generally, recording is by a seismic camera on a multitrace graph showing plots of signal amplitude against arrival time for each of the various seismometers. However, quite often it is preferred to record the signals on a multichannel magnetic record thus providing a convenient means of storing the signals for later reproduction and graphical recording by means of a seismic camera.

Interpretation of the graphical records or seismograms involves a procedure known as reflection picking wherein visual and subjective criteria, such as similarity of the waveforms in amplitude, phase and frequency content and the coincident occurrence of these similarities across several traces within a prescribed time interval, are used to identify the reflected waves and thus track seismic events of interest from trace to trace on a seismogram and from record to record over a seismic survey. The patterns of occurrence of these events of interest enable an experienced geophysicist to determine, within a reasonable degree of accuracy, the shape, size and location of the various subsurface formations and the probability of their containing oil or gas deposits.

Unfortunately, the seismometers are unable to distinguish the desired reflection waves from undesirable waves, such as direct traveling waves, mutiple reflection waves and ground "noise." Consequently, the reflection or information signals are quite often obscured by the inclusion in the seismogram of the unwanted signals with the result that the recognition of information signals becomes a difficult task. The record may be further confused by the almost imperative use of automatic gain control or time varied gain control devices in the signal amplifiers to hold the signals, which cover an extreme amplitude range, within the physical limits of the recording medium.

Thus, it can be seen that the difficulties encountered in the reflection picking procedure require that the one performing the operation possess the high degree of skill acquired only after long experience and constant practice in applying the principles of his art if success is to be achieved. The present invention has been designed to simplify this most difficult and time consuming step of the seismic exploration process.

In the practice of the present invention the signal from each output channel of a seismic signal source such as, for example, a seismometer spread or a magnetic or other type of reproducible recording, is amplified and, if desired, filtered and then fed simultaneously to an input channel of a seismic camera and to one of a bank of amplitude discriminator circuits. These amplitude discriminator circuits are designed to produce an output pulse whenever the signal of the channel providing its input exceeds an arbitrary amplitude level. The output of each discriminator circuit is fed simultaneously to another input channel of the seismic camera and to one input channel of a coincidence counter circuit. Whenever pulses from a predetermined number of the several amplitude discriminator circuits arrive at the coincidence counter within a specific time interval, the counter delivers a pulse to still another channel of the seismic camera.

Thus, the record produced by the seismic camera contains traces representing three groups of camera input channels with a separate trace for each channel in each group. The first group of traces is an ordinary seismogram showing the amplitude versus time plot of the seismic signals of each channel. The second group of traces has one trace corresponding to each trace of the first group. However, the individual traces of this second group indicate each point at which the signal of its corresponding trace in the first group has exceeded the arbitrary amplitude level mentioned before. The third group of traces, which may be several traces or only one trace, indicates each point at which a specified number of the signals of the first group of traces all exceed the arbitrary amplitude level within a short definite period of time. When more than one trace is used for this group each trace may be used to indicate coincident occurrence of signals exceeding the amplitude level on a different minimum number of traces. Thus, for example, one trace of the third group may indicate coincidence of signals exceeding the amplitude level for five traces of the first group; another trace may indicate coincidence over eight traces and still another may indicate coincidence over twelve traces.

Such a record provides the person attempting to interpret the seismogram with valuable assistance by pointing out the probable locations on the record of the information signals which, of course, must be found before they can be interpreted. In addition, there are pointed out to the interpreter the points on the record at which there is an even stronger probability of the presence of the information signals he is seeking as evidenced by high signal peaks occurring almost simultaneously over several traces.

Accordingly, it is one object of the present invention to provide electronic means to accomplish at least part of the process of seismic record reflection picking.

It is another object of the present invention to provide electronic means to identify and locate automatically information signals of probable usefulness on a seismogram record.

It is a further object of the present invention to provide electronic means to produce rapidly and accurately an indication of the informational value or confidence level of a seismic reflection record.

The above objects together with further objects and details of the construction and mode of operation of the present invention will be made apparent in the following description and the accompanying drawings in which:

FIGURE 4 is a reproduction of an actual seismic data record produced by the recording apparatus of FIGURE 1 according to the method of the present invention.

Figure 1:
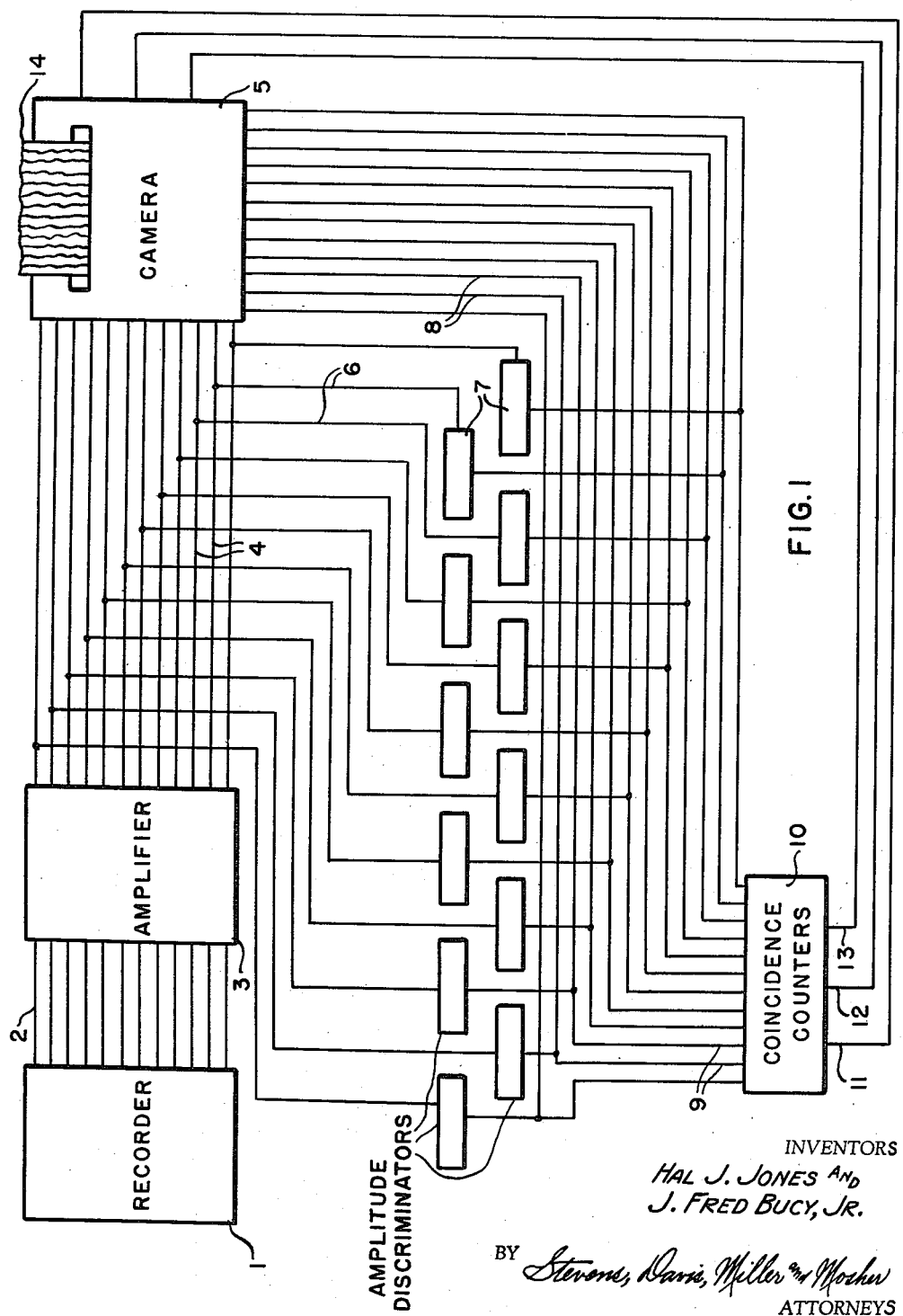
FIGURE 1 is a block diagram of the preferred embodiment of the apparatus for data reduction according to the method of the present invention.

With reference now to the drawings, and particularly to FIGURE 1, seismic data signals to be analyzed and reduced according to the method of the present invention are reproduced by a magnetic recorder 1 from a multi-channel magnetic record of the seismometer signals obtained in the field operations. The methods of seismic surveying with magnetic recording are now so well-known in the art that it is believed unnecessary to describe the procedure for obtaining such records. The signals from each seismometer or seismometer station of the spread are reproduced through individual channels, and fed by lines 2 to a bank of amplifiers 3, one for each channel. If it is desired, the signals may be filtered to eliminate certain bands of frequencies and accentuate others by individual filtering circuits following each amplifier. The signals after amplification and filtering if used, are fed on the lines 4, still in individual channels, to a first group of input channels of a seismic camera or recording oscillograph 5. The amplifiers, filters and camera may be of any of the many types commonly used in seismic work for it is not their particular circuitry or mode of operation but only the function they perform which is important to the present invention. Also, although twelve signal channels are indicated by the drawings and the camera has been shown with twenty-seven input channels, these numbers were chosen arbitrarily for illustration purposes only and should in no way be construed to limit this invention as to the number of signal channels or camera inputs to be used.

The signals fed to the first group of camera input channels are also delivered simultaneously through the lines 6 to a bank of amplitude discriminator and peak selecting circuits 7, one for each channel. The amplitude discriminators and peak selectors of the several channels are identical and thus the circuit diagramed schematically in FIGURE 2 is representative of all of the amplitude discriminators and peak selectors.

Figure 2:
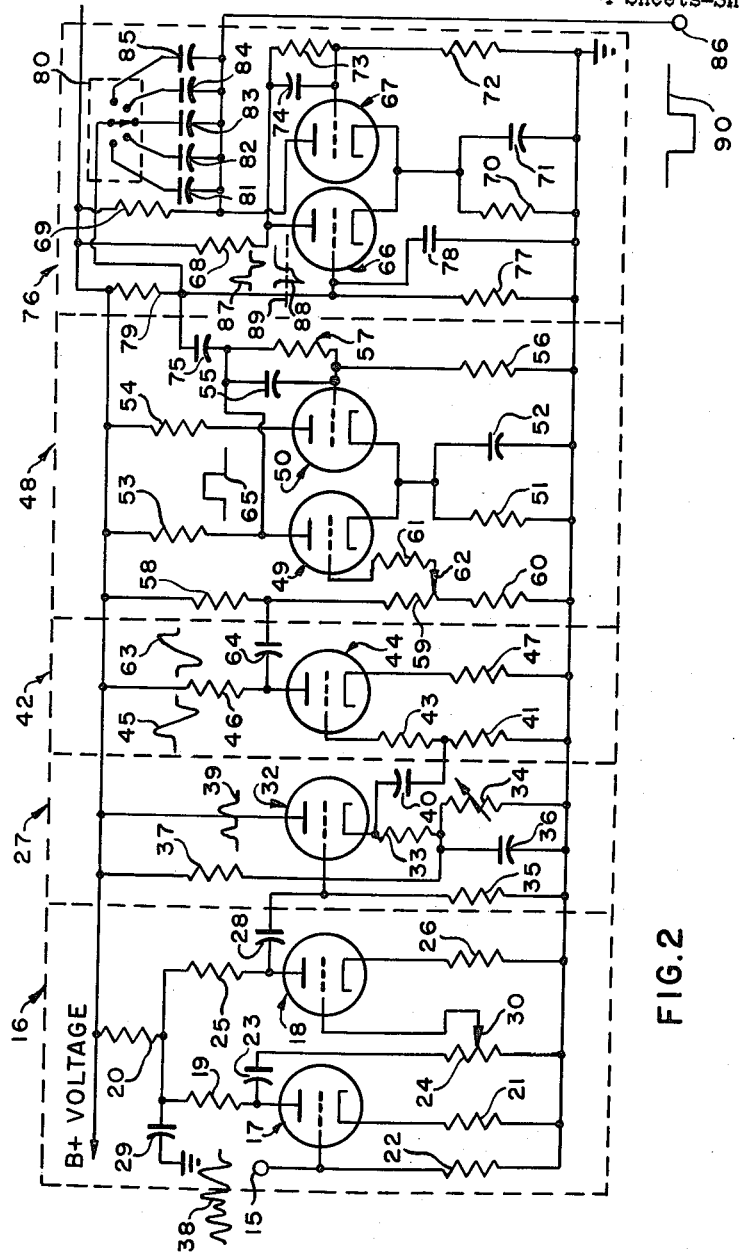
FIGURE 2 is a schematic diagram of the electronic circuit of one of several types of amplitude discriminator and peak selecting circuits suitable for use in the present invention.

In the circuit diagramed in FIGURE 2, an input signal from a channel of the amplifier-filter bank is applied to the input terminal 15 of the circuit. The first section of the amplitude discriminator is a two-stage amplifier 16 comprised of the tubes 17 and 18. Tube 17 is connected as an ordinary triode amplifier with its plate to B+ voltage through resistors 19 and 20, its cathode to ground through the resistor 21 and its grid connected to ground through resistor 22. The incoming signal from terminal 15 is coupled directly to the grid of tube 17 and the amplified signal from the plate of tube 17 is applied to the grid of tube 18 through the coupling capacitor 23 and the variable contact 30 of potentiometer 24 which functions as the gain control of the amplifier section. The tube 18 is likewise connected as an ordinary amplifier with its plate to B+ voltage through resistors 25 and 20 and its cathode to ground through resistor 26. An amplified replica of the grid signal to the tube 18 is taken from the plate of that tube and applied to the next section of the amplitude discriminator, clipper stage 27, through the coupling capacitor 28. The capacitor 29, connected between the junction point of resistors 19, 20 and 25 and ground serves to decouple the A.-C. signal from the B+ voltage supply.

The clipper stage 27 comprises the vacuum-tube 32 with its plate connected directly to B+ voltage, its cathode connected to ground through resistor 33 and variable resistor 34 and its grid connected to ground through resistor 35. A bypass capacitor 36 is connected between the junction of resistors 33 and 34 and ground and a resistor 37 is connected between that same junction point and B+ voltage, forming a voltage divider network with resistor 34. This voltage divider network provides a positive bias to the cathode of tube 32 through the resistor 33 which bias may be varied in magnitude by varying the resistance of resistor 34. This bias may be made sufficiently positive with respect to the grid of tube 32 to bias that tube well below cutoff. When biased below cutoff, the tube will act as a cathode follower-clipper. Thus, when there is coupled to the grid, through capacitor 28, a signal of the same form as that on the input terminal 15, shown at 38, only the most positive peaks of the signal will drive the tube 32 into conduction and the output signal at the cathode of tube 32 will be only the positive peaks which exceed the prescribed level as shown at 39.

This output signal from tube 32 is differentiated by the capacitor 40-resistor 41 network and applied to the next stage 42 through the resistor 43 connected to the grid of tube 44. The signal applied to the grid of tube 44 will be of the form shown at 45 with its zero axis crossing occurring just at the instant the slope of the input signal 39 changes from positive to negative, i.e. its peak. With its plate connected to B+ voltage through resistor 46 and its cathode connected to ground through resistor 47, the tube 44 acts to amplify and invert this differentiated signal and apply it to the trigger circuit 48, the next stage.

The trigger circuit 48 is connected as follows. Triode amplifier tubes 49 and 50 have their cathodes tied together and to ground through the common cathode resistor 51 with capacitor 52 as its A.-C. bypass. The plates of the tubes 49 and 50 are connected to B+ voltage through resistors 53 and 54 respectively. The plate of tube 49 is coupled to the grid of tube 50 through the parallel circuit of resistor 57 and capacitor 55. The grid of tube 50 is connected to ground through resistor 56. Resistor 58, potentiometer 59 and resistor 60 connected in series between B+ voltage and ground form a voltage divider network supplying grid bias voltage to tube 49 through the resistor 61 from the moving contact 62 of the potentiometer 59. The input signal 63 from the plate of the preceding stage is applied to the grid of tube 49 through the coupling capacitor 64, potentiometer 59 and resistor 61.

The values of the circuit components of this stage are so chosen that the grid of tube 49 is biased positive with respect to its cathode and tube 49 is normally conducting. When conducting, tube 49 draws current through the common cathode resistor 51 in an amount great enough that the cathode of tube 50 is biased sufficiently positive with respect to the grid of tube 50 that this tube is below cutoff and does not conduct. However, when the signal 63 is applied to the grid of tube 49, its sharply negative going leading edge drives the grid below the tube cutoff voltage almost instantaneously with the result that the plate voltage of the tube 49 rises quickly to B+ voltage. This sharp positive signal is applied to the grid of tube 50 causing that tube to conduct. When the slowly rising portion of the input signal to the grid of tube 49 reaches the voltage at which the tube 49 begins to conduct, slightly above the cutoff voltage, a negative going signal produced at the plate of tube 49 is applied to the grid of tube 50 so that tube 50 begins to conduct less. Consequently, less current flows through the common cathode resistor 51 and the voltage drop across this resistor decreases. This cathode potential change in the negative direction has the same effect as a positive change on the grid of tube 49 in that tube 49 immediately becomes more conductive, its plate voltage and therefore the grid voltage of tube 50 decreases resulting in a further drop in the cathode voltage of the two tubes. This action is cumulative and results in an output signal from the plate of tube 49 as shown at 65 where the sharp positive leading edge of the signal corresponds in time to the sharp negative leading edge of the input signal 63 and the sharp negative going trailing edge of the output signal 65 corresponds to the time along the positive going portion of the input signal at which tube 49 began to conduct. By adjustment of the potentiometer 59 this trailing edge of the output signal is made to correspond exactly to the point at which the output signal 63 of tube 44 crosses its zero axis line. As mentioned before, this point corresponds to the precise peak of the clipped input signal 39 from which the signals 45 and 63 are derived by differentiation.

The next stage of the amplitude discriminator-peak selector is a univibrator circuit 76 comprising two tubes 66 and 67 with their plates connected to B+ voltage through resistors 68 and 69 respectively and their cathodes connected to ground through a common cathode resistor 70 and A.-C bypass capacitor 71 connected in parallel. The grid of tube 67 is connected to ground through the resistor 72 and is coupled to the plate of tube 66 through the parallel combination of resistor 73 and capacitor 74. The incoming signal is introduced into this circuit through the capacitor 75 connected between the plate of tube 49 of the preceding trigger circuit 48 and the grid of tube 66. The grid of this tube is also connected to ground through resistor 77 and capacitor 78, to B+ voltage through resistor 79 and to the movable contact of the switch 80. The several stationary contacts of the switch 80 are coupled through individual capacitors 81, 82, 83, 84 and 85, each of a different value, to the plate of tube 67 and the circuit output terminal 86.

In normal operation of the circuit, tube 66 is conductive and tube 67 is non-conductive because of the combined effects of the positive bias on its cathode due to current drawn through resistor 70 by tube 66 and the less positive bias on its grid from its connection to the voltage divider network constituted by the series combination of resistors 68, 73 and 72 connected between B+ voltage and ground. The incoming square wave pulse from the plate of tube 49, before being applied to the grid of tube 66, is differentiated by the coupling capacitor 75 acting in conjunction with resistors 77 and 79. Thus, the signal appearing on the grid of tube 66 due to the signal from the preceding stage is a sharp positive pulse followed quickly by a sharp negative pulse as shown at 87. The positive pulse has no effect on the circuit because tube 66 is already conducting, but the negative pulse drives tube 66 sharply into cutoff. This results in a lowering of the cathode potential on tube 67 due to the cessation of current flow through the common cathode resistor 70 and also in a positive pulse to the grid of tube 67 from the plate of tube 66 through capacitor 74. As a consequence, tube 67 becomes immediately conductive producing at its plate a sharp negative signal. The negative plate signal is then applied to one plate of the capacitors 81 through 85. The capacitor at that time connected to the moving contact of switch 80, which is capacitor 83 in the diagram as shown, then begins to charge by drawing current from B+ voltage through the resistor 79. The resulting voltage drop across resistor 79 produces a voltage on the grid of tube 66 sufficiently negative to hold that tube below cutoff for a time determined by the RC time constant of the resistor 79 and the charging capacitor of switch 80. As the capacitor of switch 80 charges, the voltage on the grid of tube 66 rises until the tube again becomes conductive and its plate voltage begins to drop. This negative going signal coupled to the grid of tube 67 through the capacitor 74 causes the tube 67 to conduct less with a resultant decrease in the voltage drop across resistor 70 and thus a decrease in the cathode bias of tube 66 so that tube 66 conducts more driving the grid of tube 67 even more negative. This is a cumulative action which rapidly drives tube 67 to cutoff and tube 66 to full conduction, the normal state of the circuit. Thus it can be seen that the actual grid signal to tube 66, the combination of signal 87 from the preceding stage and the feedback signal through switch 80 is as shown at 88 where the line 89 designates the grid bias cutoff point of tube 66. The resulting output signal of the circuit appearing at the output terminal 86 is as shown at 90 with its leading edge corresponding in time to the negative pulse of the input signal 87 and therefore corresponding also to a peak on the input signal. The duration of this output pulse can be varied by changing the RC time constant of the charging circuit at the grid of tube 66 through selection of different charging capacitors 81—85 with switch 80.

Returning now to the diagram of FIGURE 1, the square wave pulses derived from the peaks of the input seismic signals of the various channels by the amplitude discriminator circuits 7 in each channel are fed on lines 8, still in their individual channels, to a second group of inputs of the seismic recording camera 5 and simultaneously on lines 9 to the several inputs of a coincidence counter circuit 10. The purpose of the coincidence counter circuit is to produce an indication or signal whenever pulses are received from a specified minimum number of the amplitude discriminator circuits within a specific time interval thus indicating coincident or very nearly coincident occurrence of high signal peaks in the several seismic input signals under analysis and the probability that these peaks represent the desired reflection signals which will impart useful information to the person attempting to analyze the signal record. Although any one of several types of coincidence circuits are suitable for use in the present invention, the circuit represented by the schematic diagram of FIGURE 3 illustrates the embodiment preferred.

Figure 3:
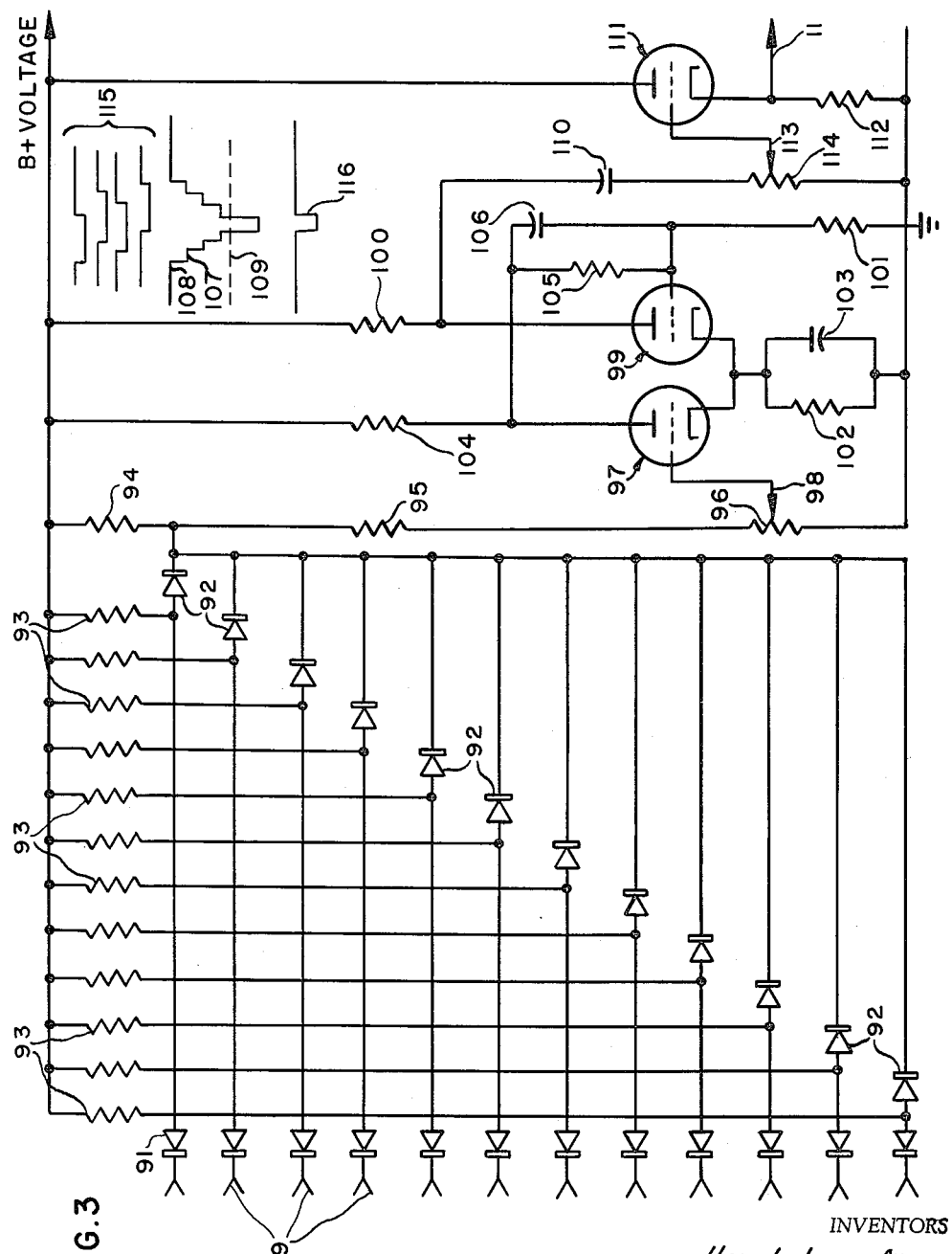
FIGURE 3 is a schematic diagram of the electronic circuit of one of several types of coincidence counter circuits suitable for use in the present invention.

Referring now to FIGURE 3, each input channel of the coincidence circuit comprises two diodes 91 and 92 with their positive terminals connected together and to B+ voltage through a common resistor 93. The negative terminals of diodes 92 for all of the input channels are connected together and to the junction of resistors 94 and 95 which, together with potentiometer 96, form a series resistance voltage divider network between B+ voltage and ground. A variable bias voltage for the grid of one tube, 97, of a univibrator circuit is taken from the moving contact 98 of the potentiometer 96. The univibrator circuit comprises, in addition to tube 97, another tube 99 with its plate connected to B+ voltage through resistor 100, its grid connected to ground through resistor 101, and its cathode tied to the cathode of tube 97 and to ground through the common cathode resistor 102 and the cathode resistor bypass capacitor 103. The plate of tube 97 is connected to B+ voltage through resistor 104 and coupled to the grid of tube 99 through the parallel combination of resistor 105 and capacitor 106. The various component values are so chosen that tube 97 is normally conducting and tube 99 is normally cutoff.

In operation, this circuit is very nearly the same as the univibrator circuit of tubes 66 and 67 described above. Thus, when the grid of tube 97 is driven negative past its cutoff point, a positive signal from its plate is coupled to the grid of tube 99 and a cumulative action as described previously is set off causing the circuit to "switch," so that tube 99 becomes suddenly conductive when tube 97 is cutoff. Since this circuit contains no charging network as did the previously described univibrator, tube 99 will remain conductive only as long as the incoming signal can hold the tube 97 at cutoff.

To accomplish its purpose of producing an output signal whenever input signals from a specified minimum number of channels occur simultaneously, a step signal is created on the grid of tube 97 in the following manner. In the arrangement shown, the diodes 91 are biased in the reverse direction by the connection of their cathodes to the plates of the tubes of their respective preceeding circuits, essentially B+ voltage, and the diodes 92 are biased in the forward direction effectively connecting the resistors 93 in parallel with the resistor 94. Thus, the current from B+ voltage through resistor 95 and potentiometer 96, and consequently the bias potential at the grid of tube 97, is a function of the resistance of the parallel combination of all of the resistors 93 and resistor 94. A negative signal on any one of the input channels of a voltage greater than the voltage drop between B+ voltage and the junction of resistors 94 and 95 will bias the diode 92 of that channel in the reverse direction and the diode 91 of that channel in the forward direction so that the current flow through the resistor 93 of that channel is to the plate of tube 67 of the preceding stage and not through resistor 95 and potentiometer 96. A decrease in the current flow through potentiometer 96 reduces the voltage drop across it and thus the grid bias to tube 97 is decreased. Therefore, when signals appear on a sufficient number of input channels simultaneously, the current flow through resistor 95 and potentiometer 96 will drop to a point at which the grid bias on tube 97 can no longer hold that tube conductive and the circuit "switches." The grid voltage curve at 107 illustrates the successive steps of the input from normal bias potential 108 to and below cutoff bias potential 109 when signals occur on four of the input channels within the specific time interval as shown at 115. The number of coincident input signals required to "switch" the circuit is a function of the quiescent state bias on the grid of tube 97 and therefore can be changed by adjustment of movable contact 98 of potentiometer 96 to change that bias. The maximum time interval over which this minimum number of input pulses can occur and still be registered as coincident, that is, trigger the circuit, is the same as the duration of the incoming pulses and therefore can be changed by changing the time constant of the charging network of the output stage 76 of the amplitude discriminator through the selection of a different charging capacitor with the switch 80.

The output signal of the coincidence counter circuit is then a short negative square wave pulse 116 which is coupled from the plate of tube 99 through the coupling capacitor 110 to the output stage. The tube 111, with its plate connected directly to B+ voltage, its cathode to ground through load resistor 112 and its grid to the moving contact 113 of potentiometer 114 between the coupling capacitor 110 and ground constitutes the output stage, an ordinary cathode follower circuit. The output signal of this circuit at the cathode of tube 111 is fed to another channel of the recording camera 5 on line 11 shown in FIGURE 1.

Although not essential, it may at times be desirable to provide more than one coincidence counter circuit in order to evaluate the record for various coincidence requirements simultaneously. For example, one coincidence circuit with separate inputs from each incoming channel could be set to produce an output pulse on one output channel, 11, when only four input signals are coincident. Another coincidence counter circuit, also with separate inputs from each channel could be set to produce an output pulse on another output channel 12 upon the occurrence of eight coincident input signals, and still a third coincidence circuit to produce an output on another channel 13 for twelve coincident input signals may be provided.

The results of the operation hereinbefore described appear in the form of pulse information on a visual record 14 from the recording camera 5. FIGURE 4 is a reproduction of an actual camera record produced according to the method of the present invention. Shown on this record are traces 117 of the seismic signals fed to the individual channels of the camera from the amplifier section 3 on lines 4. The traces 118 of the second group of channels are arranged in an order corresponding to the arrangement of the first group and show the signals received from the several amplitude discriminator channels 7 on lines 8. They indicate the location of high signal peaks on the seismic signal traces 117. A third group of traces usually contain the signals from the several coincidence circuits recorded by the camera from lines 11, 12 and 13, but since the system used to produce this particular record contained only one coincidence circuit, only one trace 119 appears on the record. As an example of the information contained on the record, the signal 120 on one of the traces of group 118 indicates a high peak 121 occurred in the signal of the corresponding trace of group 117. Further, the signal 122 of trace 119 indicates coincident occurrence of several peaks 123 in this case at least eight, in the seismic signals of trace group 117 and the signals 124 indicate the number of peaks and the traces on which they occur.

Thus, there has been described a method and apparatus for recording data signals mixed with undesirable interference signals in such a way that signals containing probable useful information are located and identified on the record. Many changes, alterations and substitutions in the method and apparatus of the present invention but still within its spirit will be obvious to those skilled in the art. For this reason, it is intended that the scope of this invention be limited only as set forth in the appended claims.

What is claimed is:

1. A seismic data reduction system including means for impressing seismic signals from a plurality of seismic signal generating means on a plurality of signal channels, means for recording said signals, means for selecting all of said signals exceeding a prescribed amplitude level and producing indications of the times at which the peaks of said selected signals occur, means for producing signals whenever predetermined minimum numbers of said indications occur within a prescribed time interval, and means for recording said last mentioned signals.

2. A seismic data reduction system including means for impressing seismic signals from a plurality of seismic signal generating means on a plurality of signal channels, means for recording said signals, means for selecting all of said signals exceeding a prescribed amplitude level and producing indications of the times at which the peaks of said selected signals occur, means for recording said indications, means for producing signals whenever predetermined minimum numbers of said indications occur within a prescribed time interval, and means for recording said last mentioned signals.

3. A data reduction system as defined in claim 2 wherein all of said means for recording comprise a multi-trace recorder.

4. A seismic data reduction system comprising a plurality of signal channels, a plurality of means inducing seismic signals in said signal channels, means receiving signals from each of said signal channels and recording said signals, means selecting signals from each of said signal channels and producing in a second plurality of signal channels signals indicative of the times at which the peak amplitudes of said selected signals exceeding a specified amplitude level occur, means receiving signals from each of said second plurality of signal channels and recording the signals received, other means for receiving signals from each of said second plurality of signal channels and producing in at least one other signal channel signals indicating the occurrence of signals in a specified minimum number of channels of said second plurality of signal channels within a prescribed time interval and means for receiving signals from said at least one other signal channel and recording the signals received.

5. A data reduction system as defined in claim 4 wherein said plurality of means inducing signals in each of said first-mentioned signal channels is a multi-channel reproducible recording.

6. A data reduction system as defined in claim 4 wherein said plurality of means inducing signals in each of said first-mentioned signal channels is a seismometer spread.

7. A data reduction system as defined in claim 4 wherein all of said recording means comprise a multi-trace graphical recorder.

References Cited in the file of this patent

UNITED STATES PATENTS

| | | | |
|---|---|---|---|
| 2,493,534 | Hawkins | Jan. 3, | 1950 |
| 2,529,666 | Sands | Nov. 14, | 1950 |
| 2,636,983 | Poole | Apr. 28, | 1953 |
| 2,698,875 | Greenwood | Jan. 4, | 1955 |
| 2,725,549 | Dunnet | Nov. 29, | 1955 |
| 2,767,388 | Rust | Oct. 16, | 1956 |
| 2,791,288 | Meier | May 7, | 1957 |